United States Patent [19]
Bauman et al.
[11] Patent Number: 4,552,901
[45] Date of Patent: Nov. 12, 1985

[54] NONSLUMPING, FOAMABLE POLYORGANOSILOXANE COMPOSITIONS CONTAINING ORGANOSILOXANE GRAFT COPOLYMERS

[75] Inventors: Therese M. Bauman; Chi-Long Lee, both of Midland, Mich.

[73] Assignee: Dow Corning Corporation, Midland, Mich.

[21] Appl. No.: 720,768

[22] Filed: Apr. 8, 1985

Related U.S. Application Data

[63] Substitute for Ser. No. 664,913, Oct. 26, 1984.

[51] Int. Cl.[4] ........ C08J 9/14
[52] U.S. Cl. ........ 521/122; 521/134; 521/154
[58] Field of Search ........ 521/122, 134, 154

[56] References Cited

U.S. PATENT DOCUMENTS 3,555,109 1/1971 Getson ........ 260/825
4,229,548 10/1980 Sattlegger et al. ........ 521/110
4,368,279 1/1983 Modic et al. ........ 521/122

FOREIGN PATENT DOCUMENTS 2911971 3/1979 Fed. Rep. of Germany .

*Primary Examiner*—Morton Foelak
*Attorney, Agent, or Firm*—Robert Spector

[57] ABSTRACT

Moisture curable, foamable compositions that do not slump appreciably in the uncured state when applied on a vertical surface, consist essentially of an RTV elastomeric composition, from 10 to 50 weight percent of a liquified blowing agent and at least 12 weight percent finely divided filler. The RTV elastomeric composition comprises the product obtained by mixing at least two moisture curable polydiorganosiloxanes with an effective amount of a moisture reactive crosslinker. A graft copolymer derived from a liquid polydiorganosiloxane and an ethylenically unsaturated organic monomer constitutes from 5 to 80 weight percent of the polydiorganosiloxanes.

11 Claims, No Drawings

NONSLUMPING, FOAMABLE POLYORGANOSILOXANE COMPOSITIONS CONTAINING ORGANOSILOXANE GRAFT COPOLYMERS

REFERENCE TO RELATED APPLICATIONS

This application is a continuation-in-part of copending application Ser. No. 664,913, filed Oct. 26, 1984.

BACKGROUND OF THE INVENTION

Field of the Invention

This invention relates to polyorganosiloxane foams. More particularly, this invention relates to one-part, nonslumping foamable polyorganosiloxane compositions that include liquified blowing agents. In the presence of atmospheric moisture and atmospheric pressure, the compositions form foams that cure with a minimum of collapse to yield useful, low density products.

It is known to prepare foams by introducing a gaseous blowing agent such as compressed air into one-part, moisture curable polyorganosiloxane compositions that are typically employed as room temperature vulcanizable (RTV) sealants. A characteristic of known RTV compositions is the long time period required for these compositions to cure to the extent that the foam becomes self supporting. One way to maintain the cellular structure of the initially produced foam during curing is to place a flowable RTV polyorganosiloxane composition in a vacuum chamber for a period of time sufficient to obtain a self-supporting foam. This technique is taught by Modic and Boudreau in U.S. Pat. No. 4,368,279, which issued on Jan. 11, 1983.

While the use of vacuum during curing may be practical for machine made foams such as slab stock and molded foams, this technique cannot be used when the foam is formed within a cavity of a building or other locations where it is not feasible to maintain the foam under vacuum during curing. In addition, the necessity of mixing in a gaseous blowing agent at the time the foam is formed requires that mixing and aerating equipment be transported to the location where the foam is to be installed. For some applications, particularly those requiring relatively small amounts of foam at remote locations, such equipment would not be practical. In these instances it would be considerably more convenient to employ a one-component foamable composition, including a blowing agent, packaged in a container that can be easily transported to the application site and which is capable of repeatedly dispensing the foamable composition without the need for additional processing steps or ingredients.

A second method for reducing the collapse of partially cured foams prepared using RTV polyorganosiloxane compositions is to incorporate fillers such as silica and calcium carbonate. Filled RTV compositions have been packaged in 2-compartment aerosol cans together with a compressed gas that supplies the pressure required to expel the composition from the can in addition to forming the cellular structure of the foam. One package foamable compositions are described in U.S. Pat. No. 4,229,548, which issued to Sattleger et al. on Oct. 21, 1980, and in German published application No. 2,911,971, which was published on Oct. 9, 1980. The cured foams are typically of relatively poor quality and characterized by average cell sizes larger than 2 mm, densities from 0.48 to 0.81 g./cc and relatively low foam height due to drainage of uncured or partially cured liquid from the cellular structure of the foam during the curing process. The need to minimize collapse of partially cured foams by the use of vacuum, by heating to accelerate curing, by the addition of large amounts of fillers or by other means requiring additional processing steps may more than offset the advantages achieved by using foamable compositions packaged in portable containers such as aerosol cans.

A disadvantage of some of the uncured foamed compositions disclosed in the Modic and Boudreau patent discussed hereinbefore is that these compositions will flow for a distance of several centimeters when placed on a vertical or sloping surface. This phenomenon is referred to as "slumping." This problem typically does not occur in highly filled compositions containing a nonliquifiable blowing agent such as air.

The advantage of liquifiable blowing agents is their ability to function as solvents while in liquified form in an aerosol container. This solvent action permits use of high molecular weight polymers that would otherwise be too viscous for use in compositions intended for dispensing from aerosol containers. High molecular weight polymers are desirable because their high viscosity minimizes drainage of liquid materials from partially cured foams.

The present invention is based on the discovery that two major disadvantages of prior art RTV foamable polyorganosiloxane compositions, namely relatively high density and foam collapse, can be reduced to acceptable levels and the slumping of uncured compositions can be substantially reduced by including in the composition a relatively small amount of filler, a liquified blowing agent and a class of diorganosiloxane graft copolymers described hereinafter. The resultant cured foams exhibit a desirable combination of low density, small average cell size and high cell concentration.

SUMMARY OF THE INVENTION

The nonslumping, one-part foamable polyorganosiloxane compositions of this invention comprise an RTV sealant composition obtained by mixing together under anhydrous conditions a hydroxyl endblocked diorganosiloxane polymer, a moisture reactive crosslinker, a filler, a liquified blowing agent, and a diorganosiloxane graft copolymer prepared by the peroxide catalyzed polymerization of an ethylenically unsaturated organic monomer in the presence of a hydroxyl-endblocked polydiorganosiloxane.

DETAILED DESCRIPTION OF THE INVENTION

This invention provides a foamable composition that is stable when confined under superatmospheric pressure and when released into an area under atmospheric pressure forms a nonslumping moisture curable foam, said composition consisting essentially of the product obtained by mixing under substantially anhydrous conditions (A) a moisture curable RTV elastomeric polyorganosiloxane composition comprising the product obtained by mixing in the absence of atmospheric moisture at least one polydiorganosiloxane curable in the presence of a moisture reactive crosslinker, a moisture reactive crosslinker and an optional curing catalyst, the amount of said crosslinker being sufficient to cure said polymer;

(B) less than 12 percent by weight of said foamable composition, of a finely divided filler;

(C) from 10 to 50 percent by weight of said foamable composition of a liquified blowing agent; and (D) from 5 to 80 percent, based on the combined weight of all polydiorganosiloxanes present in said composition, of an organosiloxane graft copolymer obtained by the peroxide catalyzed polymerization of at least one ethylenically unsaturated organic monomer in the presence of a liquid, hydroxyl endblocked polydiorganosiloxane.

The feature that characterizes the present foamable compositions is their ability to form nonslumping foams over a wide range of blowing agent concentrations using a minimum amount of filler. The graft copolymers described hereinabove make it possible to form a nonslumping foam at the low concentration of filler and high blowing agent levels required to obtain a low density foam. As used herein, "nonslumping" implies that the foamable composition will not flow more than about 1.5 cm. when applied on a substantially vertical surface.

Moisture curable RTV elastomeric compositions, referred to hereinafter as (A), are a known class of materials that are typically prepared by combining at least one polydiorganosiloxane with a moisture reactive crosslinker under conditions that exclude atmospheric moisture. Optional ingredients such as fillers, curing catalysts, adhesion promoters, pigments and flame retarding agents can also be present.

The polydiorganosiloxanes contain a silicon-bonded hydroxyl group or at least two hydrolyzable groups such as alkoxy at each of the two terminal positions of the polymer molecules. Moisture curable RTV elastomeric compositions are sufficiently described in the prior art that a detailed description of these materials is not required in this specification.

For the purposes of this invention, it should suffice to say that hydroxyl endblocked polydiorganosiloxanes suitable for use in (A) can be prepared by the base catalyzed hydrolysis and polymerization of cyclic diorganosiloxanes under controlled conditions to yield polymers of the desired molecular weight.

The organic groups present on the silicon atoms of the diorganosiloxane polymers include hydrocarbon radicals containing from 1 to 20 or more carbon atoms. The carbon atoms are, in turn, bonded to hydrogen atoms or to other atoms, such as halogen, or groups of atoms that will not adversely affect the storage stability or curing of the present foamable compositions.

The silicon-bonded hydrocarbon radicals in the diorganosiloxane polymers are preferably one or more of methyl, vinyl, phenyl and 3,3,3-trifluoropropyl. This preference is based on the availability of the intermediates used to prepare these polymers. Polydimethylsiloxanes are particularly preferred.

The polydiorganosiloxane can contain one or more of the aforementioned silicon-bonded hydrocarbon radicals in the form of repeating units such as dimethylsiloxane, diphenylsiloxane, methylphenylsiloxane and methyl-3,3,3-trifluoropropylsiloxane. Most preferably (A) includes at least one polydimethylsiloxane of the general formula $HO[Si(CH_3)_2O]_mH$ where m has an average value of from 60 up to about 600.

In addition to diorganosiloxane units, the organosiloxane portions of the polymers can contain small amounts, typically less than 0.5% by weight, of monoorganosiloxy, triorganosiloxy and $SiO_{4/2}$ units. These additional units result from impurities present in the starting materials or intermediates used to prepare the polymer. The molar ratio of hydrocarbon radicals to silicon atoms is preferably from 1.98 to 2.01.

Foamable compositions containing less than about 12% by weight of a finely divided filler and more than about 10% by weight of a liquified blowing agent are in most instances too flowable to form a nonslumping foam, however compositions of this type are particularly preferred because they typically produce lower density foams having a high concentration of uniformly small cells, i.e. cells having diameters of 2 mm or less at a concentration of at least 4 per linear centimeter. By including in the compositions from 5 to 80%, based on the combined weight of all organosiloxane polymers, of an organosiloxane graft polymer described in detail hereinbelow, the compositions can be made nonslumping. The concentration range of graft copolymer that is optimum for a particular composition will be dependent at least in part on the concentrations of silica and liquid blowing agent. This range can be determined with a minimum of experimentation by those skilled in the art using the examples contained hereinafter as a guide.

Because the degree of slump exhibited by a particular foamable composition is dependent upon a number of parameters other than the concentrations of filler and blowing agent, the range within which the graft copolymer is useful for imparting nonslumping properties to a given composition may vary slightly from those defined hereinbefore and in the accompanying claims. Parameters which effect slump include the type and particle size of the filler and the viscosity of the moisture curable organosiloxane composition, referred to hereinbefore as (A).

The organosiloxane graft copolymers that contribute to the nonslumping nature of the foamable compositions of this invention can be prepared by the peroxide catalyzed polymerization of ethylenically unsaturated organic compounds in the presence of liquid hydroxyl endblocked polydiorganosiloxanes. A preferred class of graft copolymers is described in U.S. Pat. No. 3,555,109, which issued to J. C. Getson on Jan. 12, 1971. This patent is hereby incorporated herein by reference as a teaching of suitable organosiloxane graft copolymers.

The graft copolymers disclosed by Getson are characterized by the presence of rod-shaped particles measuring from 5 to 500 micrometers in length. The copolymers are prepared by reacting a mixture containing from 20 to 50% by weight of a substantially linear hydroxyl endblocked polydiorganosiloxane exhibiting a viscosity of up to 6 Pa.s at 25° C. and from 50 to 80% by weight of one or more olefinically unsaturated organic monomers such as styrene, ethylene and esters of acrylic and methacrylic acids. The reactants are combined with an organic peroxide catalyst and the resulting mixture is stirred at a rate sufficient to produce rod-shaped particles of the desired size range. The relationship between particle size and shear rate is discussed in this patent.

A preferred graft copolymer composition is a hydroxyl terminated polydimethylsiloxane containing grafted styrene and butyl acrylate units. This copolymer is available as Silgan ® H-622 from SWS Silicones Corporation. Because a high concentration of graft copolymer may adversely affect certain desirable properties such as flame retardancy and weatherability exhibited by the cured foam, the concentration of graft copolymer should preferably not exceed about 40 weight% of the diorganosiloxane polymers in the foamable composition.

The combination of diorganosiloxane polymers in the foamable composition exhibits a viscosity of from 0.05 to 100 Pa.s at 25° C. Preferably this range is from 0.1 to 15 Pa.s. Within this preferred range, optimum combinations of practical dispensing rates for the composition and good stability of the foam during curing are achieved.

The diorganosiloxane polymer portion of (A) typically constitutes from 10 to 90% by weight of the entire foamable composition of this invention, exclusive of the liquified blowing agent. Preferably this value is from 15 to 75%.

The moisture reactive crosslinker portion of (A) can be any polyfunctional organosilicon material that will react with hydroxyl-containing polyorganosiloxanes at room temperature in the presence of atmospheric moisture to form cured compositions. One class of suitable crosslinkers includes silanes of the general formula $R_n^1SiX_{4-n}$ where $R^1$ represents a monovalent hydrocarbon radical, X is a hydrolyzable group and the average value of n is less than 2 but greater than zero. X can be, for example, acyloxy such as acetoxy; alkoxy such as methoxy; ketoximo of the formula $-ON{=}CR_2^2$ where each $R^2$ is individually alkyl containing from 1 to 4 carbon atoms and is preferably methyl or ethyl; aminoxy of the formula $-ONR_2^2$; or amido of the formula $-N(R^3)C(O)R^2$ where $R^3$ is hydrogen or $R^2$. Alternatively, X can represent two or more of the foregoing groups.

To ensure compatibility between the crosslinker and the polymer portion of (A), $R^1$ preferably represents a vinyl or a lower alkyl radical when the polymer portion of (A) consists essentially of polydimethylsiloxanes.

In place of, or in addition to the foregoing silanes, the crosslinker can include partial hydrolysis products of these silanes or siloxanes containing at least three silicon-bonded X groups per molecule.

Preferred crosslinkers for use in (A) include silanes where $R^1$ represents methyl or vinyl and X represents $-OC(O)CH_3$, $-ON(C_2H_5)_2$, $-ON{=}C(CH_3)(C_2H_5)$ or $-OCH_3$.

The crosslinker should be one that rapidly produces a cured foam. The concentration of crosslinker should be sufficient to provide a storage stable composition. To achieve storage stability, the molar ratio of hydrolyzable groups present in the crosslinker, represented by X in the foregoing formula, to the hydroxyl groups present in the ingredients used to prepare the foamable composition should be greater than 2:1. A molar ratio of at least 3:1 is preferred.

The preferred crosslinkers described hereinbefore are typically used at concentration levels of from about 0.1 to about 10 parts by weight per 100 parts by weight of the diorganosiloxane polymer portion of (A).

The prior art teaches the relative reactivities of various crosslinkers for RTV compositions and catalysts that can be employed to increase these reactivities. Selection of an appropriate crosslinker and catalyst, if required, can be accomplished with at most a minimum of experimentation by those skilled in the art using available information. Useful catalysts include inorganic and organic tin compounds, such as stannous octoate and dibutyltin dilaurate, and titanium compounds. It is known that (1) crosslinkers containing aminoxy groups of the formula ($ONR_2^2$), where $R^2$ is defined hereinbefore, as the hydrolyzable group typically do not require catalysts, and (2) titanium compounds, particularly chelated titanium compounds, effectively catalyze the reaction between silicon-bonded hydroxyl and silicon-bonded alkoxy groups in the presence of atmospheric moisture.

When alkoxysilanes are used as the crosslinker, the present compositions can optionally include any of the known hydroxyl group scavengers that are disclosed, for example, in U.S. Pat. No. 4,395,526, which issued to Chung on Jan. 3, 1984, and is incorporated herein by reference.

The filler portion, (B), of the present foamable compositions, assists in maintaining the cellular structure of the froth produced by the action of the blowing agent within the foamable composition until the composition has cured sufficiently to become self supporting. In the absence of the organosiloxane graft copolymers described hereinbefore, the relatively low filler concentration is not effective for reducing slumping using the large amount of blowing agent required to produce foams with densities less than about 0.6 g./cc.

Any of the finely divided reinforcing and nonreinforcing fillers typically used in polyorganosiloxane compositions can be present in the foamable compositions of this invention. These fillers include silica, quartz, diatomaceous earth, metal oxides such as iron oxide and metal carbonates such as calcium carbonate. Finely divided forms of silica such as fume and precipitated silicas are preferred based on the desirable properties these fillers impart to the final cured product. Fume and precipitated silicas typically have surface areas greater than about 100 $m^2/g$.

The filler is present at a concentration of less than 12 percent by weight, based on the weight of the foamable composition. At higher concentrations the properties of the cured foam, particularly density and the ability of the foamable composition to be readily and uniformly dispensed from an aerosol container, are adversely affected.

Finely divided silica fillers used in polyorganosiloxane compositions are often treated with relatively low molecular weight, liquid hydroxyl containing organic or organosilicon compounds to prevent a phenomenon referred to in the art as "crepe-hardening". The filler particles can be treated before being added to the composition or the particles can be treated "in situ" by having a suitable treating material present as an ingredient in the compositions. Known filler treating agents include low molecular weight hydroxyl-endblocked polydiorganosiloxanes. The organic radicals present on silicon are lower alkyl such as methyl or vinyl, aryl radicals such as phenyl, and radicals such as 3,3,3-trifluoropropyl.

The foamable polyorganosiloxane compositions of this invention are converted to foams by the action of a liquifiable blowing agent (C). The blowing agent is a gas under atmospheric pressure and temperatures above about 20° C., is liquified under the superatmospheric pressure used to package and store the present foamable compositions and is both miscible and unreactive with the other ingredients of the composition. When the composition is released from the storage container, it is converted to a froth by volatilization of the blowing agent. The froth gradually cures to a solid, elastomeric foam.

Suitable liquifiable blowing agents include aliphatic hydrocarbons containing three or four carbon atoms. Butane, isobutane and mixtures of isobutane and propane are particularly preferred on the basis of their cost and availability. Chlorofluorocarbons such as trifluorochloromethane will function as blowing agents but in some countries are considered undesirable for ecological reasons.

Ingredient (C) constitutes from about 10 to about 50% of the weight of the entire foamable composition. The optimum concentration range is dependent upon a number of variables, the most influential of which appears to be the viscosity of the foamable composition, which is, in turn, to a large extent dependent upon the viscosity of (A) and the amount of filler(s) present.

The optimum concentration of (C) is one that will provide the best balance between stability of the froth during curing, a sufficiently rapid discharge rate of the composition from the container in which it is stored and a relatively low density cured foam.

Too much blowing agent will produce a "slumping" foam in the absence of sufficient filler and/or organosiloxane graft copolymer. Too low a concentration of blowing agent in a viscous composition will typically yield a high density foam. For preferred foamable compositions such as those examplified hereinafter, the concentration of blowing agent is from 10 to 30%, based on the weight of the entire foamable composition.

The present compositions are preferably packaged in a 2-compartment aerosol container wherein only one compartment is equipped with a dispensing valve and contains the foamable composition and blowing agent. The second compartment is separated from the first by means of a piston or a compressible container and is filled with a propellant that can be of the same composition as the blowing agent or can be a more volatile material. The propellant provides the additional pressure required to increase the rate at which a foamable composition can be dispensed from the pressurized container. Two compartment aerosol cans are known in the art and can be equipped with any of the known types of aerosol valves.

All other conditions being equal, the maximum rate at which a foamable composition of this invention can be dispensed from a pressurized container and the rate at which liquid materials will drain during curing of the foam are both inversely proportional to the viscosity of the foamable composition. To obtain useful foams the present compositions in the absence of blowing agent should have the consistency of a thick paste.

The foamable compositions of this invention can be prepared by packaging the foregoing ingredients, (A), (B), (C), and (D) together with any of the optional additives discussed hereinbelow, under substantially anhydrous conditions in a moisture-tight container, such as an aerosol can, that is capable of withstanding the pressure exerted by the liquified blowing agent and any propellant employed.

In accordance with one such preparative method, the polymer portion of (A), graft copolymer, filler(s) and any optional additives such as pigments, adhesion promoters and flame-retarding agents are blended to homogeneity before being combined and blended with the crosslinker portion of (A) and any curing catalyst under conditions that avoid contact between these ingredients and atmospheric moisture. The resultant composition is then transferred into a pressurizable container, such as a two-compartment aerosol can, that is equipped with a dispensing valve. The desired amount of liquified blowing agent (C) is then introduced into the container by appropriate means, usually through the dispensing valve or directly into the container just prior to sealing it, and the container is shaken to uniformly disperse the blowing agent throughout the composition. Methods and equipment for packaging moisture-sensitive materials together with liquified propellants such as isobutane in pressurized containers are well known in the art and do not form part of this invention.

The pressurized containers used to package the foamable compositions are equipped with valves wherein the passages through which the composition flows are of sufficient diameter to permit discharge of the composition at a sufficiently rapid rate to form a useful foam. If the composition will be dispensed in portions over a period of several days or weeks, those passages within the valve and spray head that are exposed to atmospheric moisture should be capable of being sealed to minimize contact with atmospheric moisture and resultant curing of foamable composition remaining in these passages. It is desirable that the passages be sufficiently large in diameter to facilitate removal of cured material.

Preferably the valves are of the toggle type recommended for dispensing relatively viscous, foamable materials such as whipped cream. Most preferably the discharge tube and valve body are combined in a single member that is held in place by an elastomeric valve seat. One or more openings in the valve body are normally closed off by contact with the seat. Displacement of the discharge tube by finger pressure moves the opening(s) in the valve body away from the seat, thereby allowing the contents of the pressurized container to flow into the valve body and through the discharge tube.

Those types of aerosol valves wherein the valve body and spray head are separate units and the valve is equipped with a spring loaded piston, may be suitable for use with some of the less viscous foamable compositions of this invention.

For large scale foam preparations where storage is not required, a mixture of (A), (B) and (D) together with any other ingredients is dispensed from one container and the liquified blowing agent (C) is dispensed from a pressurized storage container. The ingredients are combined in a suitable pressurizable mixing head and the resultant foam is dispensed at the desired location.

Preferred foamable compositions of this invention are stable for periods of up to six months or more when stored in pressure-tight containers that exclude atmospheric moisture.

Cured foams prepared using the compositions of this invention are typically of the closed cell type. The size of the cells in the foam will typically be less than 4 mm in diameter. Preferably the cells will range from 0.2 to 2 mm in diameter and the cell concentration is typically greater than 4 per linear cm.

The present foams can be used in many applications where it is desirable to utilize the unique properties of moisture curable polyorganosiloxane elastomers in a lower density material. The lower density of the foams relative to the corresponding noncellular elastomers makes it possible to cover a larger area with the same weight of material. An additional advantage is the insulating properties provided by the closed cell structure of the foam.

The ability of the present foamable compositions to remain stable in a pressurized container makes it possible to combine in a single, portable package such as an aerosol container, all of the ingredients required to form a moisture curable foam. The package can then be transported to the location where the foam is to be applied rather than having to transport the individual ingredients to the location, combine them in the required amounts, and prepare a homogeneous composition just prior to forming the foam. This is particularly advantageous in those instances when relatively small amounts of foam are dispensed over a relatively long period of time.

The following example discloses a preferred embodiment of the present foamable compositions and should not be interpreted as limiting the scope of the accompanying claims. All parts and percentages are by weight unless otherwise indicated.

EXAMPLE 1

This example demonstrates the ability of a preferred organosiloxane graft copolymer to produce a nonslumping foam at the relatively low levels of silica and high concentration of blowing agent required to obtain a low density foam.

Three foamable compositions were prepared to evaluate the effect of filler and blowing agent concentrations on slump. The compositions were prepared using a Sem Kit ® tube (available from Semco, Inc., Division of Products Research and Chemical Corp., Glendale, Calif.). This device is a cylinder formed from polyethylene, resembles a tube commonly used to package caulking compounds and incorporates means for adding ingredients and stirring the contents of the tube in the absence of moisture.

One of the compositions (I) was prepared by blending together 100 parts of a hydroxyl-terminated polydimethylsiloxane exhibiting a viscosity of about 13 Pa.s at 25° C., 15 parts of a polydimethylsiloxane graft copolymer, 12 parts of fume silica (MS-7 from Cab-O-Sil Corporation), 3 parts of a hydroxyl-terminated polymethylphenylsiloxane containing 4.5 weight percent of silicon-bonded hydroxyl groups and 1.75 parts of partially hydrolyzed $H_2N(CH_2)_2N(H)CH_2CH_2CH_2Si(OCH_3)_3$ as an adhesion promoter. The resultant mixture was placed in the Sem Kit tube and degassed under reduced pressure following which 10 parts of $CH_3Si[ON{=}C(CH_3)(C_2H_5)]_3$ and 0.24 part of dibutyltin dilaurate were added, and the resultant composition was mixed for 3 minutes. The composition was then transferred into the flexible inner container of a Sepro ® aerosol can, available from The Continental Group, Inc. A valve assembly providing access to the flexible container was attached to the can by crimping and the contents of the inner container were degassed. Six parts of a liquified gas containing 80 weight percent isobutane and 20 weight percent propane were introduced into the outer compartment of the can and an amount of liquified isobutane equivalent to 17 percent by weight of the total foamable composition was introduced into the inner container through the valve. The can was then placed on a mechanical shaker for about 16 hours to distribute the isobutane blowing agent throughout the foamable composition. The graft copolymer used is reported to have been obtained by polymerizing styrene and butyl acrylate in the presence of a hydroxyl endblocked polydimethylsiloxane and a peroxide catalyst. The copolymer is available as Silgan ® H622 from SWS Silicones Corporation, Adrian, Mich.

A second composition (II) that did not contain any Silgan ® H622 was prepared as described in the first part of this Example using 100 parts of the hydroxyl endblocked polydimethylsiloxane, 3.45 of the polymethylphenylsiloxane, 11.5 parts of silica, 8 parts of the same crosslinker, 0.2 part of dibutyltin dilaurate and 38%, based on the total composition weight, of isobutane. A third composition (III) was prepared in the same manner using 100 parts of the polydimethylsiloxane, 6 parts of the polymethylphenylsiloxane, 20 parts of silica, 10 parts of the same crosslinker, 0.2 part of dibutyltin dilaurate, and 20%, based on total composition weight, of isobutane.

Foams were prepared by discharging a portion of each of these foamable compositions into a vertically oriented aluminum channel measuring 0.63 cm in width and 0.63 cm in depth. The walls and floor of the channel were at right angles with respect to one another. The distance which the composition flowed in the channel during the five minute interval after being dispensed from the container was recorded as "slump."

TABLE 1

| Composition | Silica (% by Wt.) | Isobutane (% by Wt.) | Silgan ® (% by Wt.) | Density (g./cc) | Slump (cm.) |
|---|---|---|---|---|---|
| I | 7 | 17 | 9 | 0.53 | 1.3 |
| II (control) | 6 | 38 | 0 | 0.49 | 7.6 |
| III | 12 | 20 | 0 | 0.60 | 0 |

These data demonstrate that the presence of the graft copolymer in I reduces by 40 percent the amount of silica required to reduce slumping of a foamable composition thereby reducing the density of the cured foam.

EXAMPLE 2

The difference in flow properties between a foamable composition containing a liquified hydrocarbon mixture and one containing nonliquified air, was demonstrated using a moisture curable composition containing the following ingredients:

30.9 parts of a hydroxyl endblocked polydimethylsiloxane exhibiting a viscosity of 50 Pa.s at 25° C.,
11 parts of a trimethylsiloxy endblocked polydimethylsiloxane exhibiting a viscosity of 1 Pa.s at 25° C.,
50 parts of finely divided calcium carbonate,
4 parts of fume silica,
4.09 parts of methyltrimethoxysilane,
0.0004 part of dibutyltin dilaurate.

The two polydimethylsiloxanes, calcium carbonate and silica were blended together in a Sem Kit ® tube described in Example 1 and combined with the methyltrimethoxysilane and dibutyltin dilaurate under conditions that excluded atmospheric moisture. The resultant composition was transferred into the flexible inner containers of four 2-compartment Sepro ® aerosol cans. The cans were then sealed using a cap equipped with a valve having access to the inner container. The outer compartments of two of the Sepro cans were charged with air to a pressure of 932 kPa. The outer compartments of the remaining two cans were each charged with 18 parts of a mixture containing 20 weight percent propane and 80 weight percent isobutane.

A foamable composition was also packaged in two modified Sepro cans wherein the original inner container was replaced with one formed from polyethylene. The moisture curable composition described in the first part of this example was placed in the inner container and the outer compartment was charged with 27 parts of a mixture containing 20 weight percent propane and 80 weight percent isobutane.

The use of compressed air as a propellant and blowing agent for moisture curable polyorganosiloxane compositions stored in two-compartment aerosol containers is taught in West German published application No. 2,911,971. The air, originally present only in the outer compartment, gradually diffused through the polyethylene liner into the polyorganosiloxane composition located in the inner compartment of the aerosol container.

The four foamable compositions in the unmodified Sepro cans remained under ambient conditions for 9 weeks to allow a portion of the propellant in the outer compartment to diffuse into the inner compartment containing the polyorganosiloxane composition. The compositions in the two modified cans with the polyethylene inner compartment were stored for 6½ weeks prior to being dispensed.

The density and slump exhibited by the foams obtained from the foregoing compositions are recorded in the following table. The values represent the average of the two samples of each type that were evaluated.

| Can Type | Propellant | Density (g/cc) | Slump (cm.) |
|---|---|---|---|
| Unmodified Sepro | Propane/ Isobutane | 1.1 ± 0.1(1) | 0(1) |
| Unmodified Sepro | Air | 0.92 ± 0.02(1) | 0(1) |
| Modified Sepro(3) | Propane/ Isobutane | 0.83 ± 0.1(2) | 7.6(2) |

(1)Composition stored for 9 weeks prior to being dispensed
(2)Composition stored for 6½ weeks prior to being dispensed
(3)Original inner container replaced with polyethylene container.

The density values for the foam obtained using air and the foam obtained from the modified container are similar, indicating that the compositions contained equivalent volumes of vaporized blowing agent. The foam obtained using air as the blowing agent did not slump while the one using the liquifiable blowing agent slumped considerably and requires the graft copolymer of this invention to reduce slumping. The prior art composition containing air as the blowing agent is considerably less flowable and does not require a graft copolymer to achieve a nonslumping character. The foregoing data demonstrate that choice of a liquifiable or nonliquifiable blowing agent has a profound effect on the flow properties of otherwise identical uncured organosiloxane compositions.

That which is claimed is:

1. A foamable composition which is stable when confined under superatmospheric pressure and when released into an area under atmospheric pressure forms a nonslumping, moisture-curable foam, said composition consisting essentially of the product obtained by mixing under substantially anhydrous conditions (A) a moisture-curable RTV elastomeric organosiloxane composition comprising the product obtained by mixing in the absence of atmospheric moisture at least one polydiorganosiloxane curable in the presence of a moisture reactive crosslinker, a moisture reactive crosslinker and, optionally, a curing catalyst, the amount of said crosslinker being sufficient to cure said polymer;

(B) less than 12 percent by weight, based on the weight of said foamable composition of a finely divided filler;

(C) from 10 to 50 percent by weight of said foamable composition, of a liquified blowing agent sufficient to form a foam following release of said composition into an area under atmospheric pressure; and (D) from 5 to 80 percent, based on the combined weight of all diorganosiloxane polymers present in said composition, of an organosiloxane graft copolymer obtained by the peroxide catalyst polymerization of at least one ethylenically unsaturated organic monomer in the presence of a liquid, hydroxyl endblocked polydiorganosiloxane.

2. A composition according to claim 1 where the mixture of all polydiorganosiloxanes and said graft copolymer exhibits a viscosity of from 0.05 to 100 Pa.s at 25° C.

3. A composition according to claim 1 where the polydiorganosiloxane portion of (A) is a hydroxyl endblocked polydimethylsiloxane.

4. A composition according to claim 1 where said crosslinker comprises a silane of the general formula $R_n^1SiX_{4-n}$, a partial hydrolyzate thereof, or a siloxane containing at least three silicon-bonded X groups per molecule, where $R^1$ is a monovalent hydrocarbon radical, X is a hydrolyzable group and the average value of n is less than 2 and greater than zero.

5. A composition according to claim 4 where $R^1$ is methyl or vinyl, X is acyloxy, alkoxy, ketoximo, $-ONR_2^2$ where $R^2$ represents identical or different alkyl radicals containing from 1 to 4 carbon atoms, or $-N(R^3)C(O)R^2$, where $R^3$ is hydrogen or alkyl selected from the same group as $R^2$.

6. A composition according to claim 4 where X is $-OC(O)CH_3$, $-ON(C_2H_5)_2$, $-ON{=}C(CH_3)(C_2H_5)$ or $-OCH_3$.

7. A composition according to claim 4 where the molar ratio of X groups to the total number of hydroxyl groups in said composition is at least 3:1, respectively.

8. A composition according to claim 1 where said curing catalyst is an organic or inorganic tin compound or a titanium compound.

9. A composition according to claim 1 where said composition is packaged in a container under superatmospheric pressure and substantially anhydrous conditions.

10. A composition according to claim 1 where said filler is silica and said composition contains a treating agent for said silica.

11. A composition according to claim 10 where said treating agent is a liquid hydroxyl endblocked polydiorganosiloxane.

* * * * *